July 5, 1960
J. E. HARRIS, JR., ET AL
2,944,139
COOKING RANGE OVEN WITH REMOVABLE LINER
Filed Jan. 27, 1959
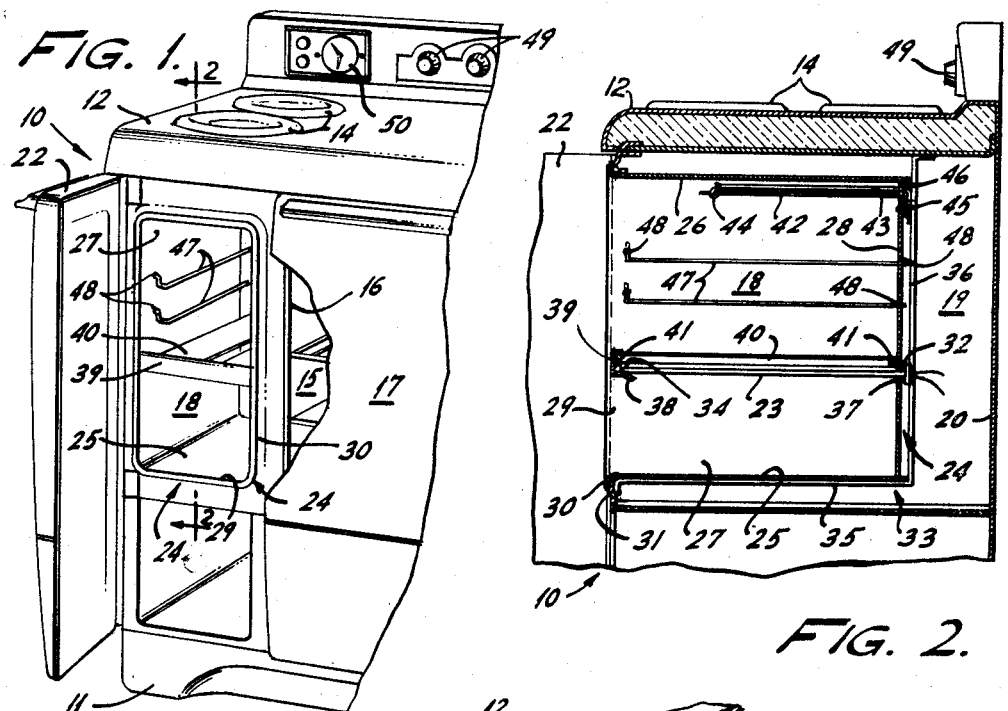
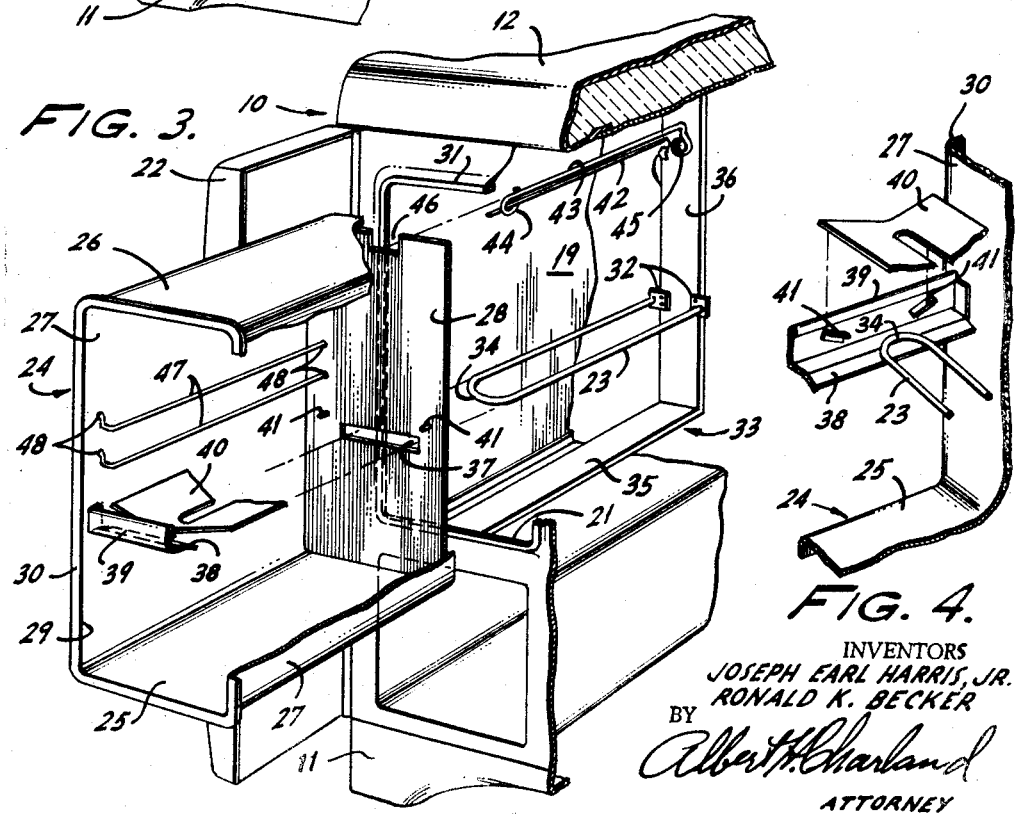
INVENTORS
JOSEPH EARL HARRIS, JR.
RONALD K. BECKER
BY
Albert H. Charland
ATTORNEY

United States Patent Office 2,944,139
Patented July 5, 1960

2,944,139

COOKING RANGE OVEN WITH REMOVABLE LINER

Joseph Earl Harris, Jr., Huntington Valley, and Ronald K. Becker, Philadelphia, Pa., assignors to Philco Corporation, Philadelphia, Pa., a corporation of Pennsylvania Filed Jan. 27, 1959, Ser. No. 789,380

6 Claims. (Cl. 219—35)

The present invention relates to cooking ranges and particularly to oven construction for domestic cooking ranges. While of broader application, the invention is especially advantageous when utilized in the construction of ovens of the type incorporated in electrically operated ranges for domestic use.

It is the primary object of this invention to provide a simple oven construction having novel structural features which greatly facilitate thorough cleaning of the oven.

It is also an object of the invention to provide an improved oven wall unit which is bodily removable and adapted to readily be disassociated from all other oven parts so that the unit can easily be handled for cleaning purposes.

Toward realization of these main objects, the invention provides an oven structure wherein a shell or liner adapted to outline the cooking space of the oven, is slidably movable into and out of an oven compartment which is defined by the cabinet structure of the cooking range. The oven compartment has a rear wall and a front opening and, in accordance with the invention, the oven heating unit is supported within said compartment adjacent its rear wall and extends in a direction toward said front opening. The oven liner has a rear wall apertured for passage of the heating unit into the space defined by the liner when inserted into the oven compartment. The heating unit is supported in a position to lie in a plane intermediate the height of the oven so that broiling can be carried out by placing food below the heating element, and roasting and baking can be done by placing food above said element. A temperature responsive element for controlling the operation of the heating unit, also can advantageously be supported within the compartment to pass through an aperture in the rear wall of the over liner and become located within said liner to sense the temperature of the air therein.

When the oven needs cleaning, it is necessary only to slide said liner out of the oven compartment, whereupon the liner, particularly its inside surface, may be thoroughly cleaned with ease. An added convenience of the improved oven construction of this invention results from the fact that the oven liner is removable without the heating unit and its temperature sensing means, so that said liner can be immersed in or flooded with a detergent solution capable of dissolving dirt, grease, burnt crust and like accumulation on the walls of the liner, thus doing away with tedious and messy scraping and scrubbing.

The full nature of the invention and the manner in which the above mentioned and other objects and features are realized, will be more fully understood from the following description taken in conjunction with the accompanying drawing, in which:

Figure 1 is a perspective view of a portion of a domestic electric range in which is incorporated a preferred embodiment of an oven constructed in accordance with the invention;

Figure 2 is a vertical sectional view looking in the general direction of arrows 2—2 of Figure 1;

Figure 3 is a perspective view, on a enlarged scale, with the oven shell or liner withdrawn from the oven compartment, parts of the structure being broken away and removed to illustrate certain features of the invention; and Figure 4 is an enlarged fragmentary view, in perspective, illustrating details of the oven construction.

Referring more particularly to the drawing, the domestic electric range shown in Figure 1 includes cabinet structure 10 mounted on a base 11 and having a top surface 12 which is supplied with customary heater plates 14. The range may be, and preferably is, provided with a regular size oven 15 having a front access opening 16 which is closed by means of a hinged door 17 of usual construction. Moreover, in the illustrated embodiment, the range is provided with an oven 18 of smaller size, and incorporating features of the present invention. This latter oven occupies a compartment 19 defined by the cabinet structure and has a back wall 20 and a front opening 21 closed by a laterally swinging door 22.

In accordance with the present invention, a heating unit 23 is supported within the compartment 19 and into the cooking space of the auxiliary oven. This cooking space is defined by means of a shell or liner 24 which is mounted within and withdrawable from the compartment 19 through its front opening 21. The shell or liner 24 is made of sheet metal and, in the illustrated embodiment, is of rectangular configuration consisting of a bottom wall 25, a top wall 26, side walls 27 and a rear wall 28. The liner has a front opening 29 and is provided with an outwardly directed peripheral flange 30 adapted to abut marginal portions 31 about the front opening 21 of the compartment 19, so as to locate said liner within said compartment. As shown, the heating unit 23 is a sheathed generally U-shaped resistor unit, the terminal ends 32 of which are suitably attached to a support member 33, and the closed looped end 34 of which is extended toward the front opening 21 of the compartment 19.

The support member 33 is in the convenient form of an L-shaped bracket, the horizontal portion or arm 35 of said bracket extending from the front opening 21 of the compartment 19 toward the back wall 20 of said compartment, and the vertical portion or upright arm 36 of said bracket being located away from and rearwardly of said opening and disposed in alignment therewith. The horizontal arm 35 of the support member 33 provides a base for supporting the oven liner 24 when inserted in operative position, whereas the vertical or upright arm 36 of said member provides a post to suspend the heating unit 23 for its positioning within the confines of said liner 24. For that purpose the rear wall 28 of said liner is provided with an elongated aperture or slot 37 through which the heater element 23 passes when said liner is inserted into the compartment 19.

As illustrated, the heating unit 23 is located in a plane intermediate the height of the oven 18 so as to occupy a position spaced from the bottom wall 25 and from the top wall 26 of the oven liner 24. Thus there is provided a broiling area as well as a roasting and baking area within said oven liner. In practice broiling of food is best carried out in the area below the heating unit, whereas baking and roasting of food is best accomplished in the area above said unit. It has been found that the dead air space surrounding the liner 24 adequately insulates the oven 18. However, if desired, suitable insulation material of the kind which sometimes is used in cooking range cabinets, could be arranged in said space and still allow free sliding of the removable oven liner on the supporting base provided, as hereinabove described, by the arm 35 of the support member 33.

As clearly seen in Figures 2 and 4 of the drawing, the extended forward or looped end 34 of the heating unit 23 rests upon a shelf 38 formed as part of a cross piece 39. This cross piece is located adjacent the front opening 29 of the shell or liner 24 and spans the side walls 27 thereof. When in operative position within said liner 24, the heating unit 23 is covered with a heat shield 40, the latter being suspended in slightly spaced position with respect to said heating unit, by means of projections 41 provided on the cross piece 39 and on the rear wall 28 of said liner.

Operation of the heating unit 23 is advantageously controlled by function of thermostatic means which includes a temperature sensitive element, such as a feeler tube 42, adapted to sense the temperature of the air within the oven 18. In the illustrated embodiment, the feeler bulb is conveniently suspended by means of a hanger in the form of a rod 43 having loop 44 into which said bulb fits, and further having an anchoring end 45 attached to the upright arm 36 of the support member 33. The feeler bulb which, as best seen in Figure 3, extends from said arm adjacent the rear wall 20 of the compartment 19 toward the front opening 21 thereof, is disposed to pass through an aperture or window 46 in the upper portion of the rear wall 28 of the liner 24. Thus, the feeler bulb occupies a position within the interior of said liner and is enabled to detect the temperature of the air therein.

Dishes, pans or like receptacles containing food to be cooked above the heating unit 23 are conveniently supported on racks (not shown) which are of usual construction and adapted to be suspended on rods 47. These rods extend along the side walls 27 of the liner 24, and, preferably, are detachable from said liner. For that purpose, the ends of each rod pass through holes 48 formed in the side walls 27 and rear wall 28 of the liner 24.

Operation of the oven 18, of the top heater plates 14, and of the larger oven 15, is controlled by actuation of conventional controlling means including manually operable knobs 49 and timer-clock 50.

To clean the oven liner 24, the door 22 is opened so that said liner can be slidably withdrawn from the compartment 19. Either before or after withdrawing of the liner from its position in the mentioned compartment, the shield 40 and the rack-supporting rods 47 may be detached from their supporting means and removed for thorough cleaning. With the liner 24 out of the compartment 19, the heating unit 23 and feeler bulb 42, both of which remain in said compartment, can be readily wiped clean. The removed liner also can be readily cleaned, the cleaning being facilitated by the fact that the liner may, if desired, be immersed in a cleansing solution, allowed to soak therein, and thereafter wiped dried. After cleaning, the liner 24 is reinserted into the oven compartment, and the shield 40 and supporting rods 47 returned to their positions, so that the oven is again ready for use.

From the foregoing description, it will be appreciated that this invention provides a novel arrangement which makes it easy to effect thorough cleaning of ovens. Although the invention has been shown and described with reference to a preferred embodiment, and in an oven of smaller size, it will be recognized that this embodiment is susceptible to structural variations within the scope of the subjoined claims.

What we claim is:

1. A cooking range comprising cabinet structure defining an oven compartment having an access opening, a heating unit fixedly suspended in space within said compartment to extend in a direction toward said access opening, thermostatic means for controlling the operation of said heating unit and including a temperature sensing element fixedly suspended in space within said compartment and extending in a direction toward said access opening, and an oven liner mounted within and withdrawable from said compartment through said access opening and with respect to said heating unit and sensing element, said liner having apertured wall portions for passage of said unit and element into said liner when the latter is inserted within said compartment.

2. A cooking range comprising cabinet structure defining an oven compartment having a back wall and a front opening, a heating unit fixedly suspended in space within said compartment adjacent said back wall and extended in a direction toward said front opening, and an oven liner mounted within and withdrawable from said compartment through said front opening and with respect to said heating unit, said liner having an apertured rear wall for passage of the extended portion of said unit in suspended position within said liner when the latter is inserted within said compartment, said liner further having means for engagement with said portion of said unit to support the latter within said liner.

3. A cooking range comprising cabinet structure defining an oven compartment having a back wall and a front opening, a support bracket mounted within said compartment and having a horizontal portion and a vertical portion, said horizontal portion extending from said front opening toward said back wall, said vertical portion being disposed away from and rearwardly of said opening, a heating unit affixed to said vertical portion and projecting forwardly therefrom in a direction toward said front opening, thermostatic means for controlling the operation of said heating unit and including a temperature sensing element carried by said vertical portion and projecting therefrom in a direction toward said front opening, and an oven liner mounted within and withdrawable from said compartment through said front opening and with respect to said heating unit and said sensing element, said liner being slidably supported by said horizontal portion and having a rear wall provided with apertures for passage of said unit and element into said liner when inserted within said compartment.

4. A cooking range as set forth in claim 3, in which a cross piece is mounted within the mentioned liner and is provided with means engaging the forwardly projecting portion of the mentioned heating unit to support the latter within said liner.

5. A cooking range comprising cabinet structure defining an oven compartment having a front opening, a heating unit fixedly supported within said compartment, said element having its major portion extended in a direction toward said front opening, an oven liner mounted within and withdrawable from said compartment through said front opening and with respect to said heating unit, said liner having walls defining an oven chamber and including a rear wall provided with an aperture for passage of said heating element into said chamber when said liner is mounted within said compartment, said heating element being supported in a plane intermediate the height of said chamber, and a heat shield suspended within said chamber adjacent one side of the mentioned heating unit to divide said chamber into two different cooking areas.

6. A cooking range as set forth in claim 5, in which the mentioned heat shield is suspended above the mentioned heating unit to divide the mentioned chamber into a lower broiling area and an upper roasting and baking area.

References Cited in the file of this patent

UNITED STATES PATENTS

| | | |
|---|---|---|
| 1,137,050 | Carlson | Apr. 27, 1915 |
| 1,336,058 | Wilson | Apr. 6, 1920 |
| 1,798,763 | Smith | Mar. 31, 1931 |
| 2,116,669 | Dadson | May 10, 1938 |
| 2,279,064 | Rutenber | Apr. 7, 1942 |
| 2,536,613 | Schulze | Jan. 2, 1951 |
| 2,746,448 | Holmsten | May 22, 1956 |